(12) United States Patent
Jang et al.

(10) Patent No.: US 11,525,413 B2
(45) Date of Patent: Dec. 13, 2022

(54) GAS ENGINE HEAT PUMP AND METHOD OF OPERATING THE SAME

(71) Applicant: LG ELECTRONICS INC., Seoul (KR)

(72) Inventors: Heejoong Jang, Seoul (KR); Hojong Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/407,322

(22) Filed: Aug. 20, 2021

(65) Prior Publication Data

US 2022/0056861 A1 Feb. 24, 2022

(30) Foreign Application Priority Data

Aug. 21, 2020 (KR) .................. 10-2020-0105222

(51) Int. Cl.
*F02D 41/00* (2006.01)
*F02M 26/34* (2016.01)
(Continued)

(52) U.S. Cl.
CPC ......... *F02D 41/0077* (2013.01); *F02D 29/04* (2013.01); *F02D 41/1461* (2013.01);
(Continued)

(58) Field of Classification Search
CPC .. F02D 41/0077; F02D 29/04; F02D 41/1461; F02D 41/0047; F02D 41/0235;
(Continued)

(56) References Cited

U.S. PATENT DOCUMENTS

2014/0278017 A1 9/2014 Kolhouse et al.

FOREIGN PATENT DOCUMENTS

CN 203374450 U * 1/2014
DE 10-2017-111027 11/2017
(Continued)

OTHER PUBLICATIONS

European Search Report dated Feb. 10, 2022 issued in Application No. 21192405.5.

*Primary Examiner* — Joseph J Dallo
(74) *Attorney, Agent, or Firm* — Ked & Associates

(57) ABSTRACT

A gas engine heat pump and a method of operating the same are provided. According to an embodiment of the present disclosure, the gas engine heat pump includes: an engine for burning a mixture of air and fuel; an exhaust gas compressor for compressing exhaust gases coming from the engine; a buffer tank for storing the exhaust gases compressed by the exhaust gas compressor; an exhaust gas valve disposed between the buffer tank and an intake manifold of the engine; an exhaust gas spray nozzle for spraying the exhaust gases stored in the buffer tank into a cylinder of the engine; an exhaust gas sensor for acquiring information on the exhaust gases coming from the engine; and a controller, wherein the controller controls the operation of at least one of the exhaust gas valve and the exhaust gas spray nozzle, based on the information on the exhaust gases acquired by the exhaust gas sensor. Other various embodiments are possible.

20 Claims, 10 Drawing Sheets

(51) Int. Cl.
  *F02M 26/35* (2016.01)
  *F02M 26/37* (2016.01)
  *F02D 29/04* (2006.01)
  *F02D 41/14* (2006.01)

(52) U.S. Cl.
  CPC ............ *F02M 26/34* (2016.02); *F02M 26/35* (2016.02); *F02M 26/37* (2016.02)

(58) Field of Classification Search
  CPC ........ F02M 26/34; F02M 26/35; F02M 26/37; F02M 26/20; F25B 13/00; F25B 41/20; F25B 2327/001; F25B 2400/13; F25B 27/00; F25B 27/02; F01N 2610/06; F01N 2610/1406; F01N 2610/1433; F01N 2610/1453; F01N 2610/146; F01N 2900/08
  See application file for complete search history.

(56) References Cited

FOREIGN PATENT DOCUMENTS

| | | | |
|---|---|---|---|
| DE | 10-2019-201048 | 7/2020 | |
| WO | WO-2005090763 A1 * | 9/2005 | .............. F02B 37/04 |
| WO | WO 2013/050442 | 4/2013 | |

\* cited by examiner

GAS ENGINE HEAT PUMP AND METHOD OF OPERATING THE SAME

CROSS-REFERENCE TO RELATED APPLICATION(S)

This application claims priority under 35 U.S.C. § 119 to Korean Application No. 10-2020-0105222, filed in Korea on Aug. 21, 2020, whose entire disclosure(s) is/are hereby incorporated by reference.

BACKGROUND OF THE DISCLOSURE

Field of the Disclosure

The present disclosure relates to a gas engine heat pump and a method of operating the same, and more particularly, to a gas engine heat pump that runs a compressor in the heat pump connected by a drive pulley by running the gas engine, and a method of operating the same.

Related Art

A heat pump refers to a device that transfers heat from a low-temperature heat source to a high-temperature heat source or transfers heat from a high-temperature heat source to a low-temperature heat source by using heat generated by refrigerant or condensation heat. Generally, the heat pump may include a compressor, an outdoor unit including an outdoor heat exchanger or the like, and an indoor unit including an indoor heat exchanger or the like.

An engine is a device that generates power by using a fuel/air mixture (mixed fuel), and is used in various industrial fields such as air conditioning systems, cars, and power generating facilities. For example, the engine may be used in a heat pump system, and a compressor constituting a refrigeration cycle for cooling or heating may be run by a gas engine, not by electricity.

Meanwhile, exhaust gases produced by burning a mixed fuel in the engine include nitrogen oxides (NOx), carbon monoxide (CO), hydrocarbon (HC) gases, etc., and many countries set limits on concentrations of oxides of nitrogen in exhaust gases.

A generally used nitrogen oxide reduction technology is selective catalytic reduction of nitrogen oxides (SCR of NOx), which converts nitrogen oxides into nitrogen and oxygen by using ammonia, urea, or hydrocarbon as a reductant to be reacted onto a catalyst.

However, in the case of selective catalytic reduction of nitrogen oxides, if oxygen is present in an exhaust gas, hydrocarbon reacts first with the oxygen, which results in low performance in the reduction of nitrogen oxides. Moreover, in a case where a liquid urea produced by dissolving urea, which is present in solid phase at ambient temperature, is sprayed onto an exhaust pipe, the liquid urea is converted to ammonia through thermal decomposition at a temperature of around 150° C. or above, and the ammonia (NH3) may be used as a reductant. This method is disadvantageous in that additional devices such as a liquid urea storage container and a spray device add more weight and volume and the liquid urea needs to be continuously filled.

SUMMARY

One aspect of the present disclosure is to solve the aforementioned problems and other problems.

Another aspect of the present disclosure is to provide a gas engine heat pump that is capable of reducing the production of nitrogen oxides by using exhaust gases coming from the engine, when the engine is running, and a method of operating the same.

The aspects of the present disclosure are not limited to the foregoing, and other aspects not mentioned herein will be able to be clearly understood to those skilled in the art from the following description.

An exemplary embodiment of the present disclosure provides a gas engine heat pump including: an engine for burning a mixture of air and fuel; an exhaust gas compressor for compressing exhaust gases coming from the engine; a buffer tank for storing the exhaust gases compressed by the exhaust gas compressor; an exhaust gas valve disposed between the buffer tank and an intake manifold of the engine; an exhaust gas spray nozzle for spraying the exhaust gases stored in the buffer tank into a cylinder of the engine; an exhaust gas sensor for acquiring information on the exhaust gases coming from the engine; and a controller, wherein the controller controls the operation of at least one of the exhaust gas valve and the exhaust gas spray nozzle, based on the information on the exhaust gases acquired by the exhaust gas sensor.

Another exemplary embodiment of the present disclosure provides a method of operating a gas engine heat pump including: an engine for burning a mixture of air and fuel; an exhaust gas compressor for compressing exhaust gases coming from the engine; and a buffer tank for storing the exhaust gases compressed by the exhaust gas compressor, the method including: acquiring information on the exhaust gases coming from the engine; and controlling the operation of at least one of an exhaust gas valve and an exhaust gas spray nozzle, based on the information on the exhaust gases acquired by the exhaust gas sensor, wherein the exhaust gas valve is disposed between the buffer tank and an intake manifold of the engine, and the exhaust gas spray nozzle is configured to spray the exhaust gases stored in the buffer tank into a cylinder of the engine.

Specific details of other embodiments are included in the detailed description and drawings.

According to various embodiments of the present disclosure, it is possible to reduce the production of nitrogen oxides, since the combustion temperature in the cylinder may be lowered to various temperatures by compressing at least part of the exhaust gases coming from the engine and storing it in the buffer tank and supplying the exhaust gases stored in the buffer tank to the intake manifold according to a predetermined condition or spraying it directly into the cylinder.

Furthermore, according to various embodiments of the present disclosure, it is possible to reduce the production of nitrogen oxides, since the temperature of the mixture and the combustion temperature in the cylinder may be lowered by spraying condensate produced from the exhaust gases to an intake pipe while the engine is running.

The effects of the present disclosure are not limited to the aforementioned effects, and other effects, which are not mentioned above, will be apparent to those skilled in the art from the description included in the appended claims.

DESCRIPTION OF EXEMPLARY EMBODIMENTS

Figure 1:
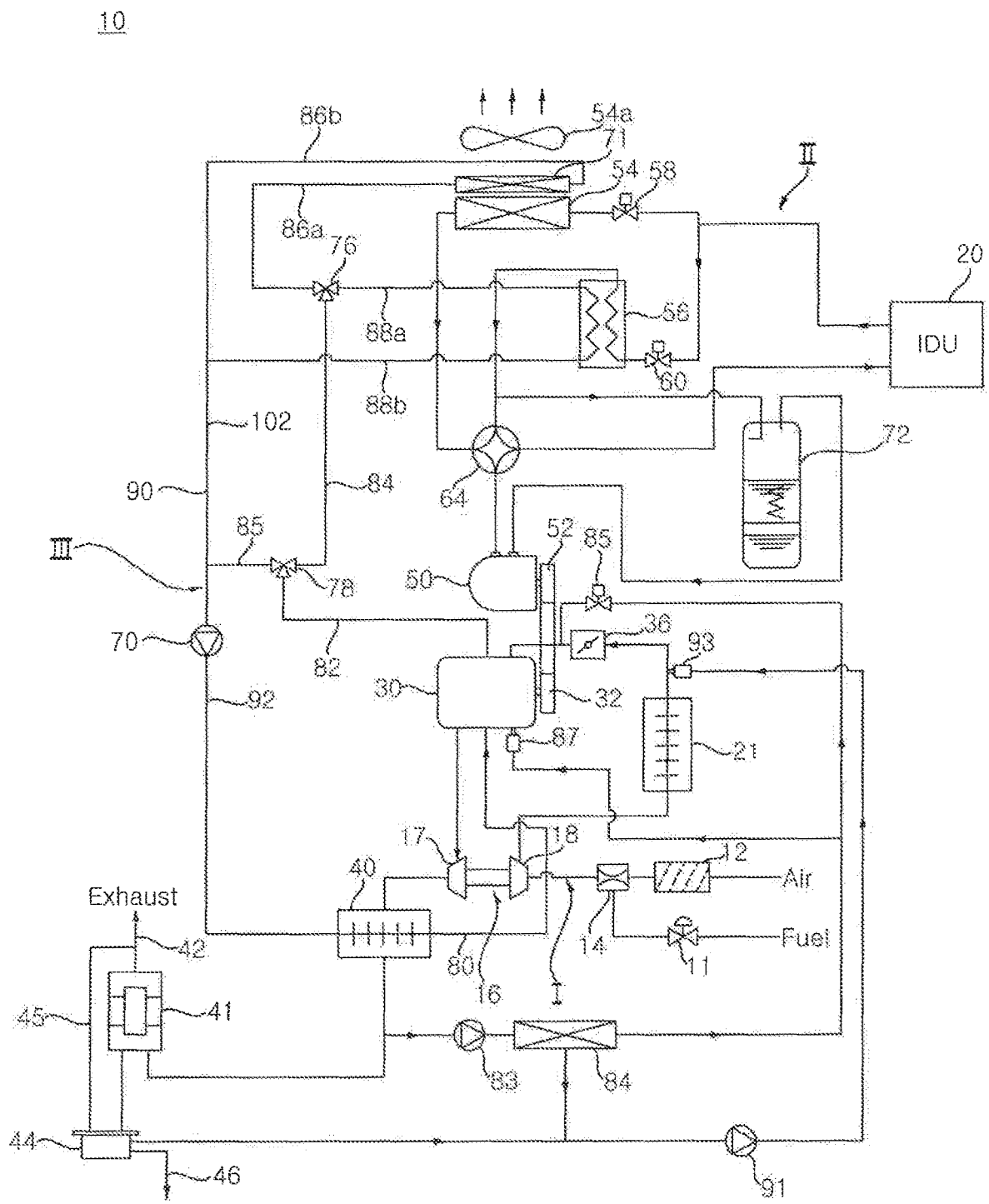
FIG. 1 is a schematic view of a configuration of a gas engine heat pump according to one embodiment of the present disclosure.

The present disclosure will be described in detail below with reference to the drawings. In the drawings, to clearly and briefly explain the present disclosure, an illustration of elements having no connection with the description is omitted, and the same or extremely similar elements are designated by the same reference numerals throughout the specification.

Hereinafter, suffixes "module" and "unit, part, or portion" for components used herein in description are merely provided only for facilitation of preparing this specification, and thus they are not granted a specific meaning or function. Hence, it should be noted that "module" and "unit, part, or portion" are used interchangeably.

It will be further understood that the terms "comprise", "include", or "have" used in this specification, specify the presence of stated features, steps, numerals, operations, components, parts, or a combination thereof, but do not preclude the presence or addition of one or more other features, numerals, steps, operations, components, parts, or a combination thereof.

Although terms like a first and a second are used to describe various elements, the elements are not limited to the terms. The terms are used only to discriminate one element from another element.

Figure 2:
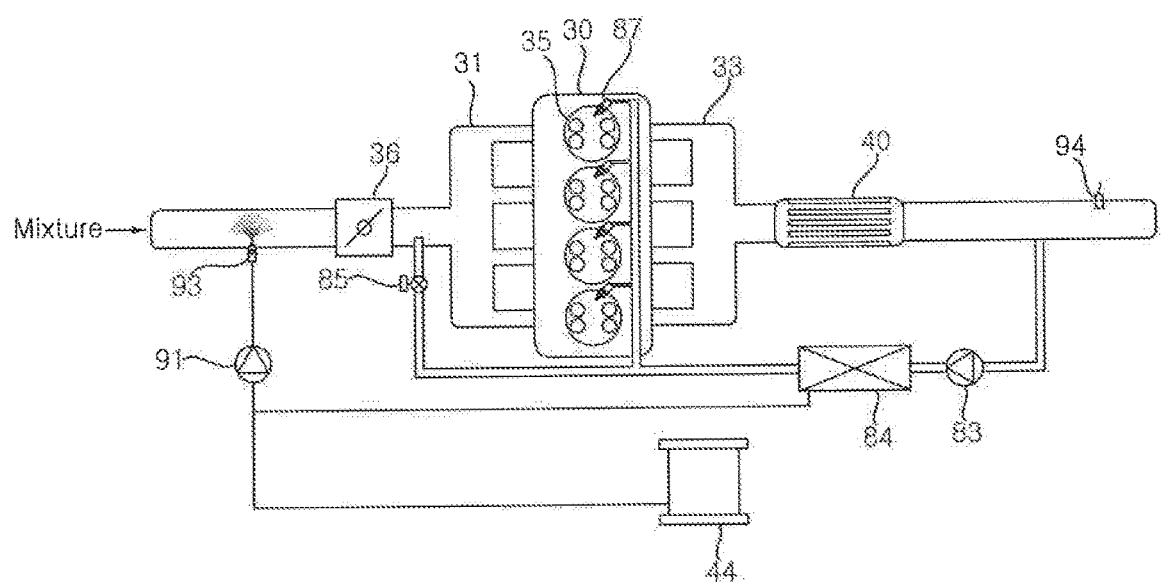
FIG. 2 is a view illustrating some components of the gas engine heat pump of FIG. 1.

FIG. 1 is a schematic view of a configuration of a gas engine heat pump according to one embodiment of the present disclosure. FIG. 2 is a view illustrating some components of the gas engine heat pump of FIG. 1.

Referring to FIGS. 1 and 2, the gas engine heat pump 10 may include a gas engine portion I, a heat pump II, and/or a cooling water circulating portion III.

The gas engine heat pump 10 may further include a controller (not shown) for controlling the overall operations of the components. The controller of the gas engine heat pump 10 may be disposed in the gas engine portion I, the heat pump II, or the cooling water circulating portion III.

The controller of the gas engine heat pump 10 may include at least one processor, and may control the overall operation of the gas engine heat pump 10 by using the processor included in it. Here, the processor may be a general processor such as a central processing unit (CPU). Also, the processor may be a dedicated device such as an ASIC or other hardware-based device.

The gas engine portion I may include a zero governor 11 for supplying a fuel at a predetermined pressure or below, an air cleaner 12 that filters and releases air, a mixer 14 that mixes fuel and air with a certain mixing ratio, an engine 30 that works by burning the fuel, a throttle valve 36 that regulates the amount of fuel supplied to the engine 30, and/or an exhaust gas heat exchanger 40 that transfers heat between exhaust gases coming from the engine 30 and cooling water.

The zero governor 11 may refer to a device that supplies fuel always at a constant pressure by adjusting the exit pressure to a constant level regardless of changes in the pressure or flow of fuel introduced into the zero governor 11. The zero governor 11 may provide a stable exit pressure over a wide range and adjust the pressure of gas fuel supplied to the engine 30 to an almost constant level in the form of atmospheric air. The zero governor 11 may have two solenoid valves to shut off the fuel supply.

The air cleaner 12 may use a filter to shut off entry of moisture and oil in the form of dust and mist contained in outside air.

The engine 30 may refer to an internal combustion engine that works through a process of burning compressed gases. The engine 30 may rotate an engine drive pulley 32 disposed on one side of the engine 30 through 4 strokes of intake, compression, explosion, and exhaust.

The engine drive pulley 32 may rotate a compressor drive pulley 52 which is to be described below.

The engine 30 may include a plurality of pistons (not shown), a plurality of cylinders (not shown) that ignite a supplied fuel so that the piston in each cylinder reciprocates, a connecting rod (not shown) that converts the reciprocating motion of the pistons to rotational motion, and a crank shaft (not shown) that rotates in connection with the connecting rod.

The engine 30 may further include an intake manifold 31 that supplies the fuel-air mixture delivered to the engine 30 through the throttle valve 36 to each of the cylinders and/or an exhaust manifold 33 that collects exhaust gases coming from the cylinders.

The intake manifold 31 may be formed with a plurality of distribution ducts to distribute the fuel to each of the cylinders, and the exhaust manifold 33 may be formed with a plurality of ducts that are respectively connected to the cylinders and converge into one exhaust duct.

The engine 30 may include a cam sensor (not shown) that detects a top dead center of a piston and a crank sensor (not shown) that provides information to calculate the number of revolutions of the engine 30. For example, the gas engine heat pump 10 may determine the position of a piston with respect to the top dead center by comparing signals from the cam sensor and the crank sensor, and may control the fuel injection timing and operating conditions for each cylinder based on the position of the piston.

The engine 30 may further include a starter motor (not shown) for starting the engine and an ignition plug (not shown) for igniting the fuel-air mixture that has passed through the compression stroke.

The starter motor may operate during a predetermined period of time from the start of operation of the engine 30. After the starter motor is activated, the compressor 50 may operate in a segment during which the number of revolutions (RPM) of the engine 30 is adjusted, depending on whether the startup of the engine 30 is successful or not.

The exhaust gas heat exchanger 40 may transfer heat between exhaust gases coming from the engine 30 and cooling water. For example, the exhaust gas heat exchanger 40 may transfer heat between exhaust gases coming from the engine 30 and cooling water that is pumped to flow by the cooling water pump 70. In this case, the cooling water passed through the exhaust gas heat exchanger 40 may re-enter the engine 30 to cool the engine 30.

Meanwhile, according to various embodiments of the present disclosure, the gas engine portion I may further include a turbocharger 16 for compressing the fuel-air mixture supplied to the engine 30 and an intercooler 21 for cooling the fuel-air mixture compressed in the turbocharger 16. In this drawing, the turbocharger 16 is illustrated as an example of the charger, but the present disclosure is not limited thereto and the gas engine heat pump 10 may have a supercharger.

The turbocharger 16 may compress the fuel-air mixture into a high-temperature, high-pressure state and supply it into the engine 30. For example, a turbine 17 of the turbocharger 16 may spin using exhaust gases coming from the engine 30, and blades 18 connected to the turbine 17 may compress the fuel-air mixture flowing into the engine 30. In this case, the turbine 17 and the blades 18 may be connected by a single rotating shaft.

The intercooler 21 may cool a high-temperature fuel-air mixture supplied to the engine 30 through the turbocharger 16, by using air or water.

The heat pump II may include an indoor unit 20, at least one compressor 50 for compressing refrigerant, an outdoor heat exchanger 54 for transferring heat between refrigerant and outdoor air, an auxiliary heat exchanger 56 for transferring heat between refrigerant and cooling water, an expansion valve 58 disposed between the indoor unit 20 and the outdoor heat exchanger 54 to expand flowing refrigerant, a reversing valve 64, and an accumulator 72.

The indoor unit 20 may include an indoor heat exchanger (not shown) for transferring heat between refrigerant and indoor air and/or an indoor unit fan (not shown) that rotates to cause indoor air to flow to an indoor space after heat exchange, by which the temperature of the indoor space may be controlled.

The compressor 50 may be connected to the engine 30 and compress refrigerant by the engine 30's operation. For example, the compressor 50 may be connected to the compressor drive pulley 52, and when the engine drive pulley 32 rotates by running the engine 30, the compressor drive pulley 52 connected to the engine drive pulley 32 rotates, thereby compressing the refrigerant.

An outdoor unit fan 54a that forms an air flow may be disposed in the outdoor heat exchanger 54 to transfer heat between outdoor air and refrigerant. Meanwhile, a heat radiator 71 may be disposed in the outdoor heat exchanger 54 to cool cooling water with air.

The auxiliary heat exchanger 56 may transfer heat between cooling water for cooling the engine 30 and refrigerant, and may include a plate-type heat exchanger.

A first expansion valve 58 may be disposed between the indoor unit 20 and the outdoor heat exchanger 54, and a second expansion valve 60 may be disposed between the indoor unit 20 and the auxiliary heat exchanger 56.

The reversing valve 64 may deliver a high-temperature, high-pressure refrigerant coming from the compressor 50 to the outdoor heat exchanger 54 or the indoor unit 20 depending on the operation mode of the heat pump.

The accumulator 72 may separate a liquid refrigerant from an incoming refrigerant and supply a gaseous refrigerant to the compressor 50. The accumulator 72 may operate as a resistor in the circulation of refrigerant, since it separates the liquid refrigerant and the gaseous refrigerant from each other and discharges the gaseous refrigerant.

The cooling water circulating portion III may circulate cooling water to absorb heat produced from the engine 30 and emit the absorbed heat through a separate heat exchanger or the like. The cooling water circulating portion III may operate in such a way that cooling water passes through the exhaust gas heat exchanger 40 and the engine 30 sequentially, thereby absorbing heat emitted from exhaust gases and heat produced from the engine 30.

The cooling water circulating portion III may include a cooling water pump 60 that circulates cooling water or adjusts the flow rate of cooling water.

The cooling water circulating portion III may cool cooling water by means of the heat radiator 71, disposed on one side of the outdoor heat exchanger 54 which transfers heat between refrigerant and air, and/or the auxiliary heat exchanger 56 which transfers heat between refrigerant and cooling water.

The cooling water circulating portion III may further include a first three-way valve 76 that selectively sends cooling water to the heat radiator 71 or the auxiliary heat exchanger 56 after heat exchange in the engine 30 and a second three-way valve 78, upstream of the first three-way valve 76, that sends cooling water to the cooling water pump 70 or the first three-way valve 76 after heat exchange in the engine 30.

The cooling water coming from the engine 30 may enter the second three-way valve 78 via an engine outlet duct 82, and the cooling water introduced into the second three-way valve 78 may flow to the cooling water pump 70 or the first three-way valve 76.

The cooling water introduced into the first three-way valve 76 may be supplied to the heat radiator 71 through an outdoor heat exchanger inlet duct 86a or to the auxiliary heat exchanger 56 through an auxiliary heat exchanger inlet duct 88a.

The cooling water flowing through an outdoor heat exchanger outlet duct 86b after being discharged from the heat radiator 71 and the cooling water flowing through an auxiliary heat exchanger outlet duct 88b after being discharged from the auxiliary heat exchanger 56 may flow to a cooling water pump inlet duct 90 and then enter the cooling water pump 70.

The cooling water coming from the cooling water pump 70 may enter the exhaust gas heat exchanger 40 through a cooling water pump outlet duct 92, and the cooling water coming from the exhaust gas heat exchanger 40 may be supplied to the engine 30 through an engine inlet duct 80.

The gas engine heat pump 10 may further include a muffler 41 disposed on an exit side of the exhaust gas heat exchanger 40 to reduce noise from exhaust gases, an exhaust gas outlet tube 42 for discharging exhaust gases coming out of the muffler 41, and/or a drain filter 44 for purifying condensate water produced in the muffler.

Moisture contained in the exhaust gases may condense into mist while passing through the exhaust gas heat exchanger 40, and the moist in mist form may collide with a board in the muffler 41 or an inner wall of the exhaust gas outlet tube 42, thereby producing condensate. In this instance, the condensate produced in the muffler 41 or the exhaust gas outlet tube 42 may be acid.

The gas engine heat pump 10 may further include a condensate bypass tube 45 disposed between the exhaust gas outlet tube 42 and a drain filter 44, through which the condensate produced in the exhaust gas outlet tube 42 flows to the drain filter 44, and a condensate discharge tube 46 through which the condensate neutralized in the drain filter 44 flows. Regarding this, a description will be made later with reference to FIGS. 4A through 4C.

The gas engine heat pump 10 may further include an exhaust gas sensor 94 that acquires information on the exhaust gases coming from the engine 30. For example, the exhaust gas sensor 94 may be disposed on an exit side of the exhaust gas heat exchanger 40. Here, the information on the exhaust gases may include parameters related to nitrogen oxides including nitric oxide (NO) and nitrogen dioxide (NO2), and nitrous oxide (N2O). For example, the information on the exhaust gases may include the presence or absence of nitrogen oxides in the exhaust gases, the concentration of nitrogen oxides in the exhaust gases, and the partial pressure of nitrogen oxides in the exhaust gases.

The exhaust gas sensor 94 may provide quantitative information such as the concentration, partial pressure, and total content of nitrogen oxides.

The exhaust gas sensor 94 may be configured as a mixed potential type gas sensor. Here, the mixed potential type gas sensor may be comprised of an oxygen ion conductor formed of a solid electrolyte such as stabilized zirconia, an oxide sensing electrode formed on one side of the oxygen ion conductor, a first noble metal electrode formed over the oxide sensing electrode, and a second noble metal electrode formed on the other side of the oxygen ion conductor, and may measure the concentration of nitrogen oxide gases by measuring an electromotive force between the first and second noble metal electrodes.

The gas engine heat pump 10 may include an exhaust gas compressor 83 that compresses at least part of the exhaust gases coming from the engine 30, a buffer tank 84 that stores the exhaust gases compressed by the exhaust gas compressor 83, an exhaust gas valve 85 disposed between the buffer tank 84 and the intake manifold 31 of the engine 30, and/or an exhaust gas spray nozzle 87 that sprays the exhaust gases stored in the buffer tank 84 into each cylinder of the engine 30.

Figure 3:
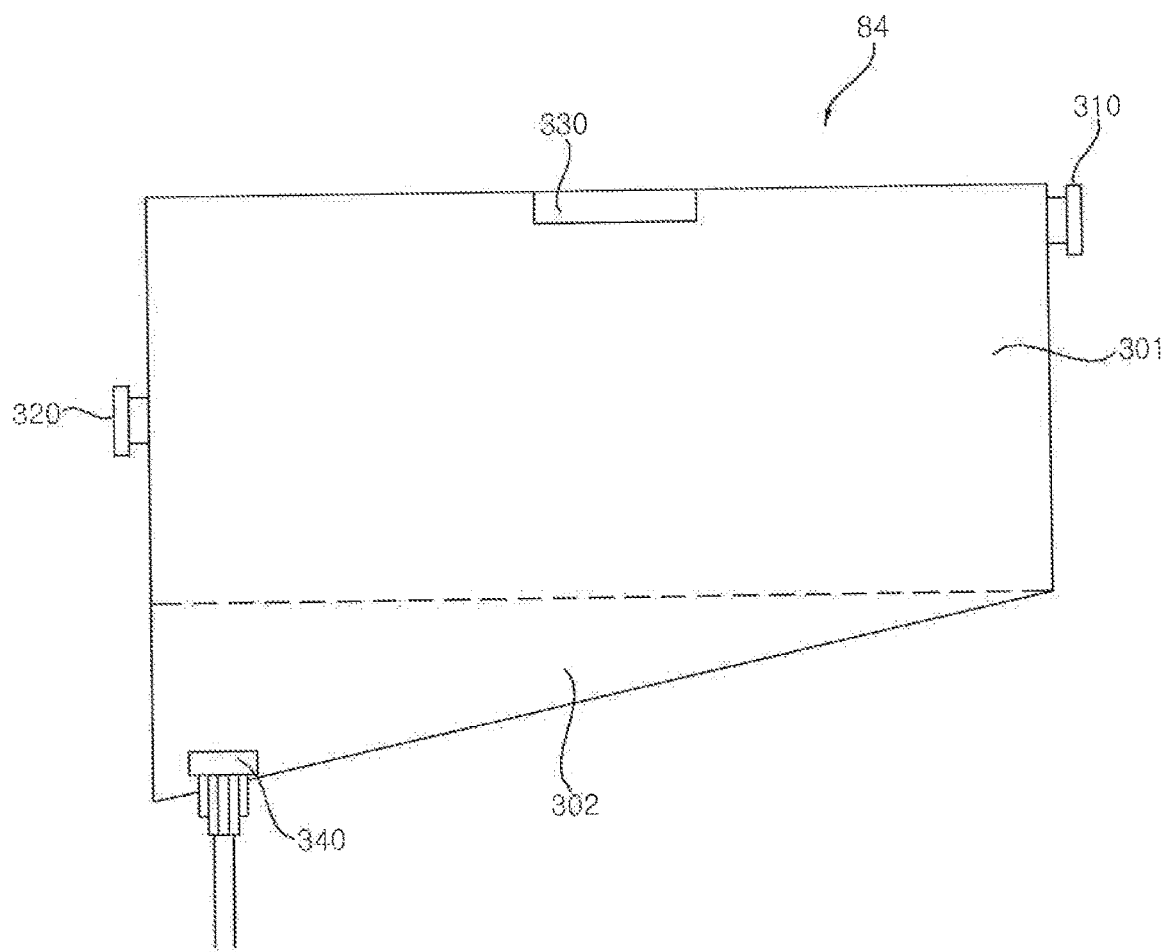
FIG. 3 is a view to be referenced to explain a configuration of the buffer tank of FIG. 1.

FIG. 3 is a view to be referenced to explain a configuration of the buffer tank 84 of FIG. 1.

Referring to FIG. 3, the buffer tank 84 may include an inlet port 310 through which exhaust gases compressed by the exhaust gas compressor 83 are admitted, an outlet port 320 through which the exhaust gases are released, a pressure sensor 330 for sensing a gas pressure inside the buffer tank 84, and/or a discharge port 340 through which condensate produced in the buffer tank 84 is discharged.

As the moisture in mist form contained in the exhaust gases admitted through the inlet port 310 collides with the inner wall of the buffer tank 84 while flowing in a first area 301 of the buffer tank 84, condensate may be produced in the buffer tank 84, and the produced condensate may be stored in a second area 302 of the buffer tank 84 by gravitational force. In this case, the condensate stored in the second area 302 of the buffer tank 84 may be discharged out of the buffer tank 84 via the discharge port 340.

Referring back to FIGS. 1 and 2, when the exhaust gas valve 85 is opened, the exhaust gases stored in the buffer tank 84 may flow to the intake manifold 31. In this case, the amount of the exhaust gases flowing to the intake manifold 31 from the buffer tank 84 may vary depending on the opening degree of the exhaust gas valve 85. Meanwhile, the opening degree of the exhaust gas valve 85 may be determined by the controller of the gas engine heat pump 10.

The exhaust gas spray nozzle 87 may spray the exhaust gases stored in the buffer tank 84 into each cylinder of the engine 30 based on a preset amount of spray. In this case, the amount of spray from the exhaust gas spray nozzle 87 may be determined by the controller of the gas engine heat pump 10.

Figure 4A:
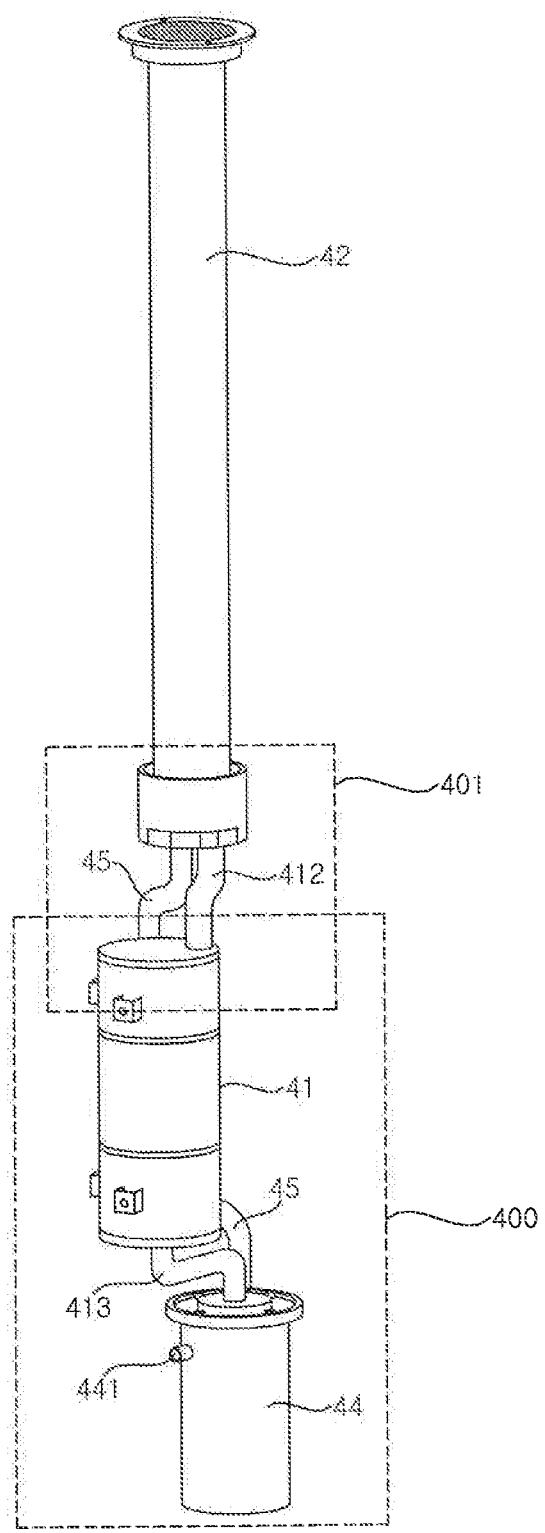
FIGS. 4A; 4B; and 4C are views to be referenced to explain configurations of the muffler, drain filter, and exhaust gas outlet tube of FIG. 1.
Figure 4B:
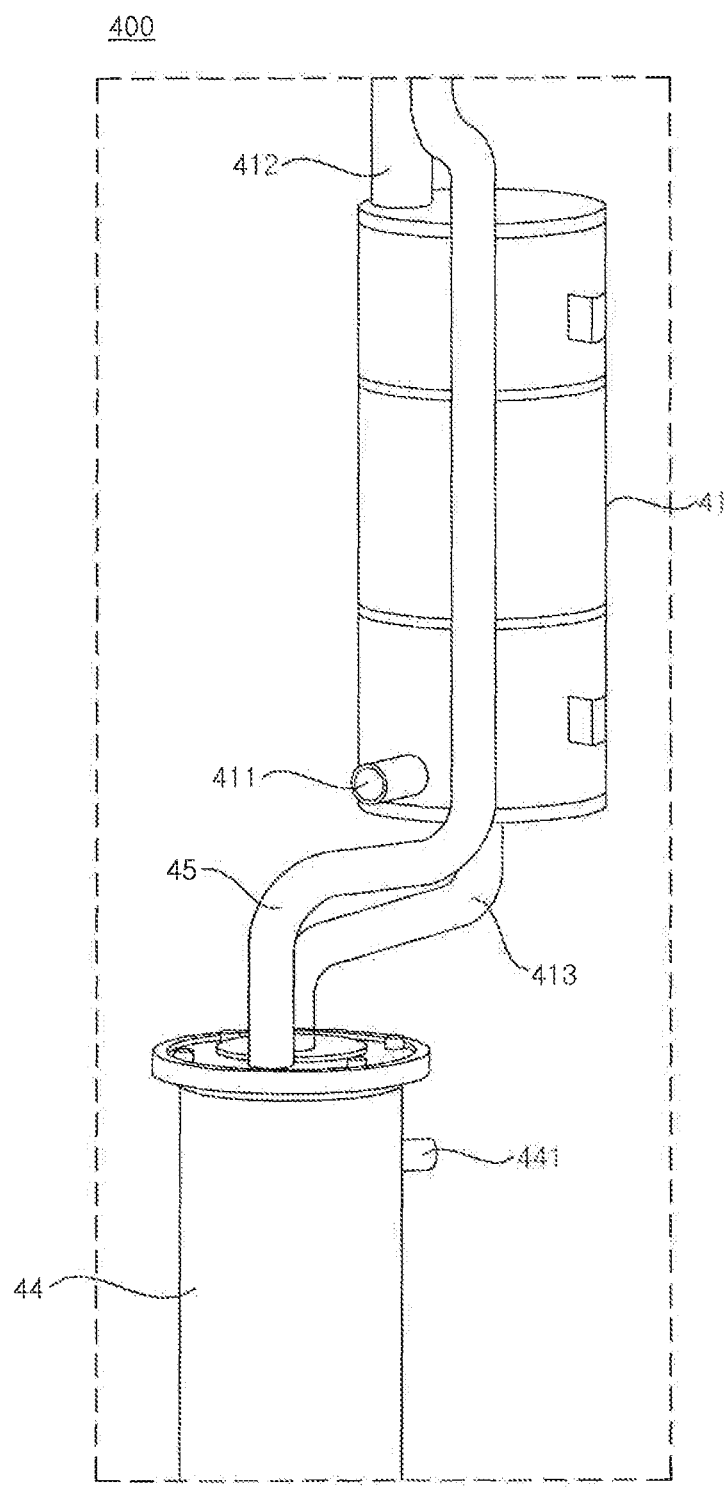
Figure 4C:
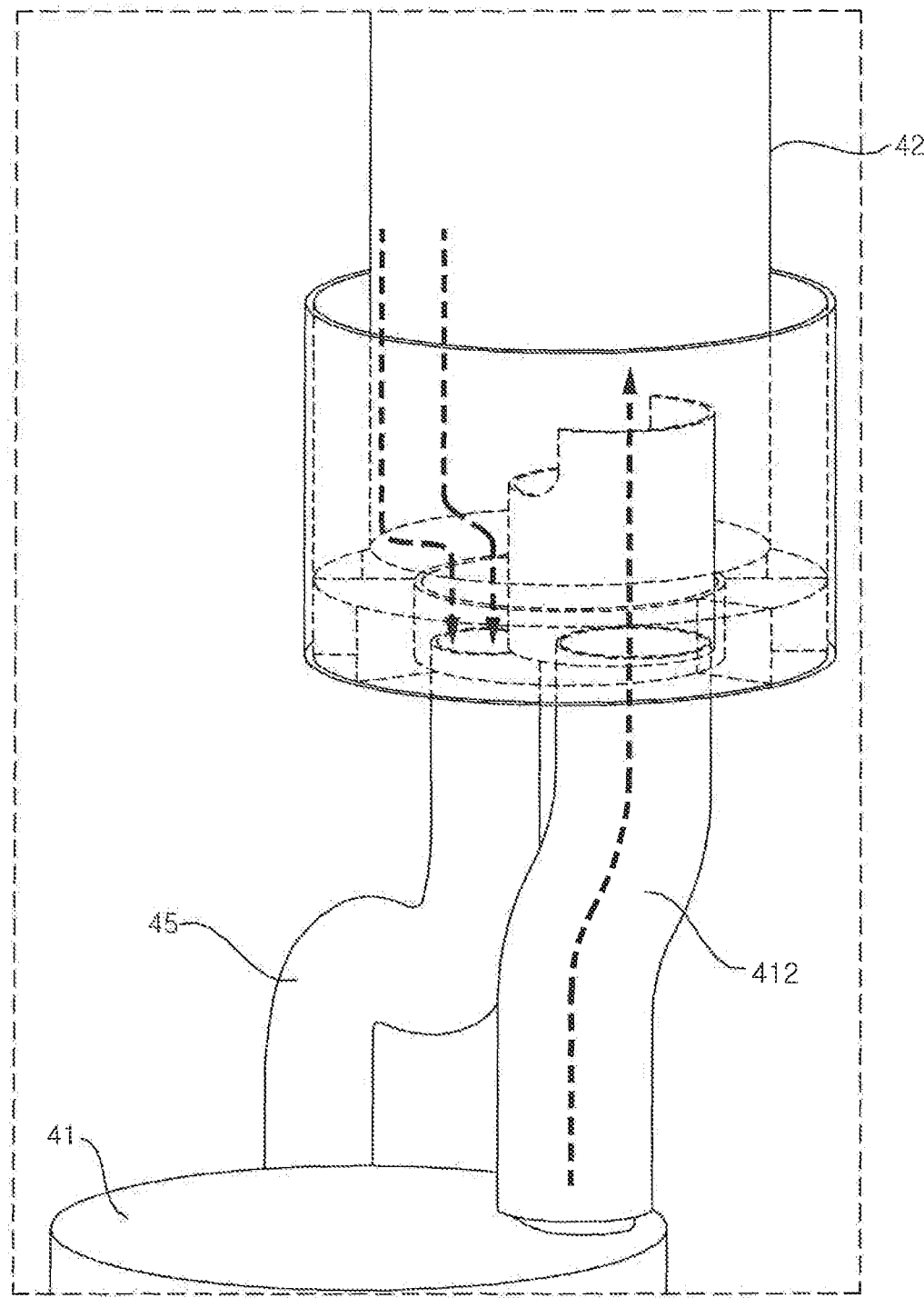

FIGS. 4A; 4B; and 4C are views to be referenced to explain configurations of the muffler, a drain filter, and exhaust gas outlet tube of FIG. 1.

Referring to FIGS. 4A; 4B; and 4C, in a case where exhaust gases released from the exhaust gas heat exchanger 40 through an exhaust gas inlet port 411 of the muffler 41 are admitted into the muffler 41, the exhaust gases may flow to the exhaust gas outlet tube 42 through an exhaust gas outlet pipe 412, and the condensate produced in the muffler 41 may flow to the drain filter 44 through a condensate discharge pipe 413.

The exhaust gases flowing through the exhaust gas outlet pipe 412 may be released through the exhaust gas outlet tube 42, and the condensate produced when the moisture contained in the exhaust gases collide with the inner wall of the exhaust gas outlet tube 42 may flow to the drain filter 44 through the condensate bypass tube 45.

The drain filter 44 may neutralize the condensate introduced through the condensate discharge pipe 413 and/or the condensate bypass tube 45 and then discharge the condensate through a condensate discharge port 441 connected to the condensate discharge tube 46.

Referring back to FIGS. 1 and 2, the gas engine heat pump 10 may include a condensate pump 91 that moves the condensate from at least one of the drain filter 44 and the buffer tank 84 and a condensate spray nozzle 93 that sprays the condensate water pumped to flow by the condensate pump 91 into a pipe (hereinafter, intake pipe) connected to the throttle valve 36.

In this case, the amount of spray from the condensate spray nozzle 93 may be determined by the controller of the gas engine heat pump 10.

Figure 5:
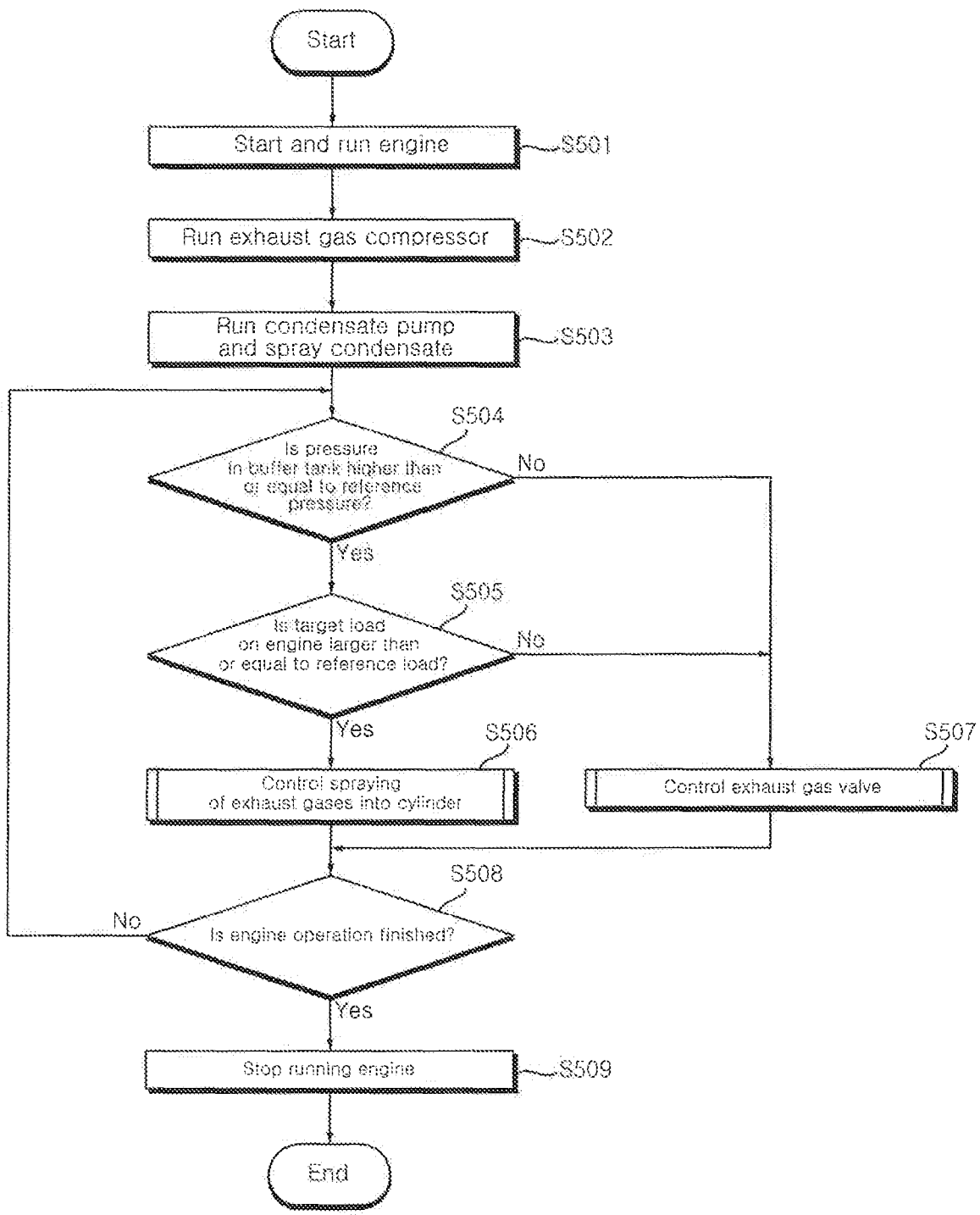
FIGS. 5; 6; and 7 are flowcharts of a method of operating a gas engine heat pump according to one embodiment of the present disclosure.
Figure 8:
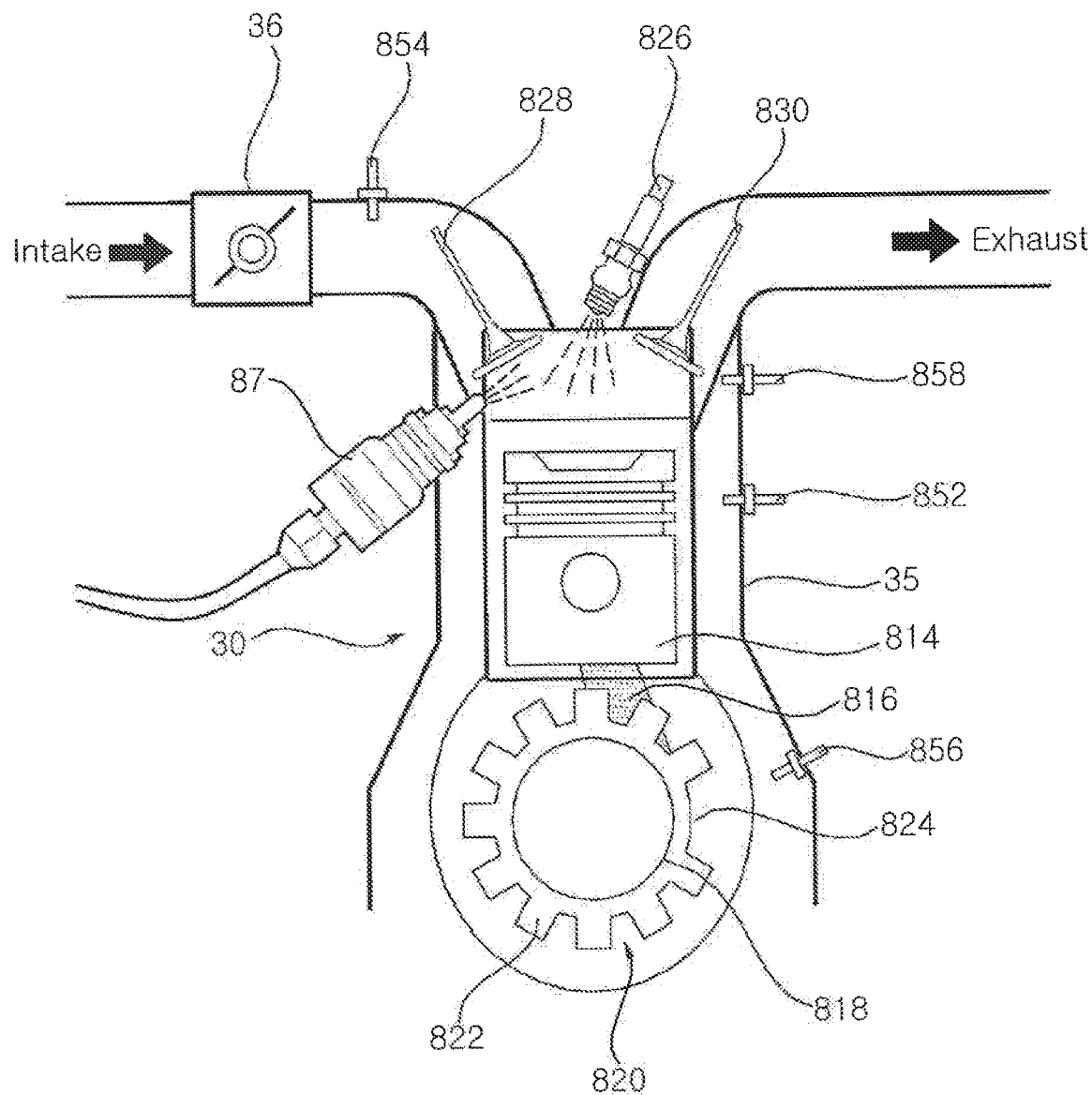
FIG. 8 is a view to be referenced to explain the method of operating the gas engine heat pump.

FIGS. 5; 6; and 7 are flowcharts of a method of operating a gas engine heat pump according to one embodiment of the present disclosure. FIG. 8 is a view to be referenced to explain the method of operating the gas engine heat pump.

Referring to FIG. 5, in the step S501, the gas engine heat pump 10 may start and run the engine 30. For example, the gas engine heat pump 10 may run the starter motor and ignition plug 826 provided in the engine 30 so as to control the engine 30 to perform intake, compression, explosion, and exhaust strokes.

In the step S502, the gas engine heat pump 10 may run the exhaust gas compressor 83 to compress at least part of exhaust gases coming from the engine 30. The exhaust gases compressed by the exhaust gas compressor 83 may be stored in the buffer tank 84.

In the step S503, the gas engine heat pump 10 may run the condensate pump 91 and spray condensate pumped to flow by the condensate pump 91 into the intake pipe connected to the throttle valve 36 via the condensate spray nozzle 93. In this instance, the condensate is sprayed into the intake pipe in mist form, which may lower the temperature and density of the mixture flowing through the intake pipe.

In the step S504, the gas engine heat pump 10 may determine whether a gas pressure inside the buffer tank 84 is higher than or equal to a preset reference pressure or not. Here, the reference pressure may refer to a gas pressure (e.g., 2 bar) which allows exhaust gases to be sprayed properly via the exhaust gas spray nozzle 87.

In the step S505, if the gas pressure inside the buffer tank 84 is higher than or equal to the preset reference pressure, the gas engine heat pump 10 may determine whether a target load on the engine 30 is larger than or equal to a preset reference load or not.

As the exhaust gas valve 85 is opened, the exhaust gases stored in the buffer tank 84 flow to the intake manifold 31 and are then mixed with an air-fuel mixture and the condensate and supplied to a cylinder 35 of the engine 30. In this case, the combustion temperature in the cylinder 35 may be lowered but the output and performance of the engine 30 may be decreased to some extent. In view of this, the gas engine heat pump 10 may control the operation of the exhaust gas valve 85 and/or exhaust gas spray nozzle 87, based on the determination of whether the target load on the engine 30 is larger than or equal to the reference load or not.

In the step S506, if the gas pressure inside the buffer tank 84 is higher than or equal to the reference pressure and the target load on the engine 30 is larger than or equal to the reference load, the gas engine heat pump 10 may control the exhaust gas spray nozzle 87's operation of spraying exhaust gases into the cylinder 35.

Figure 6:
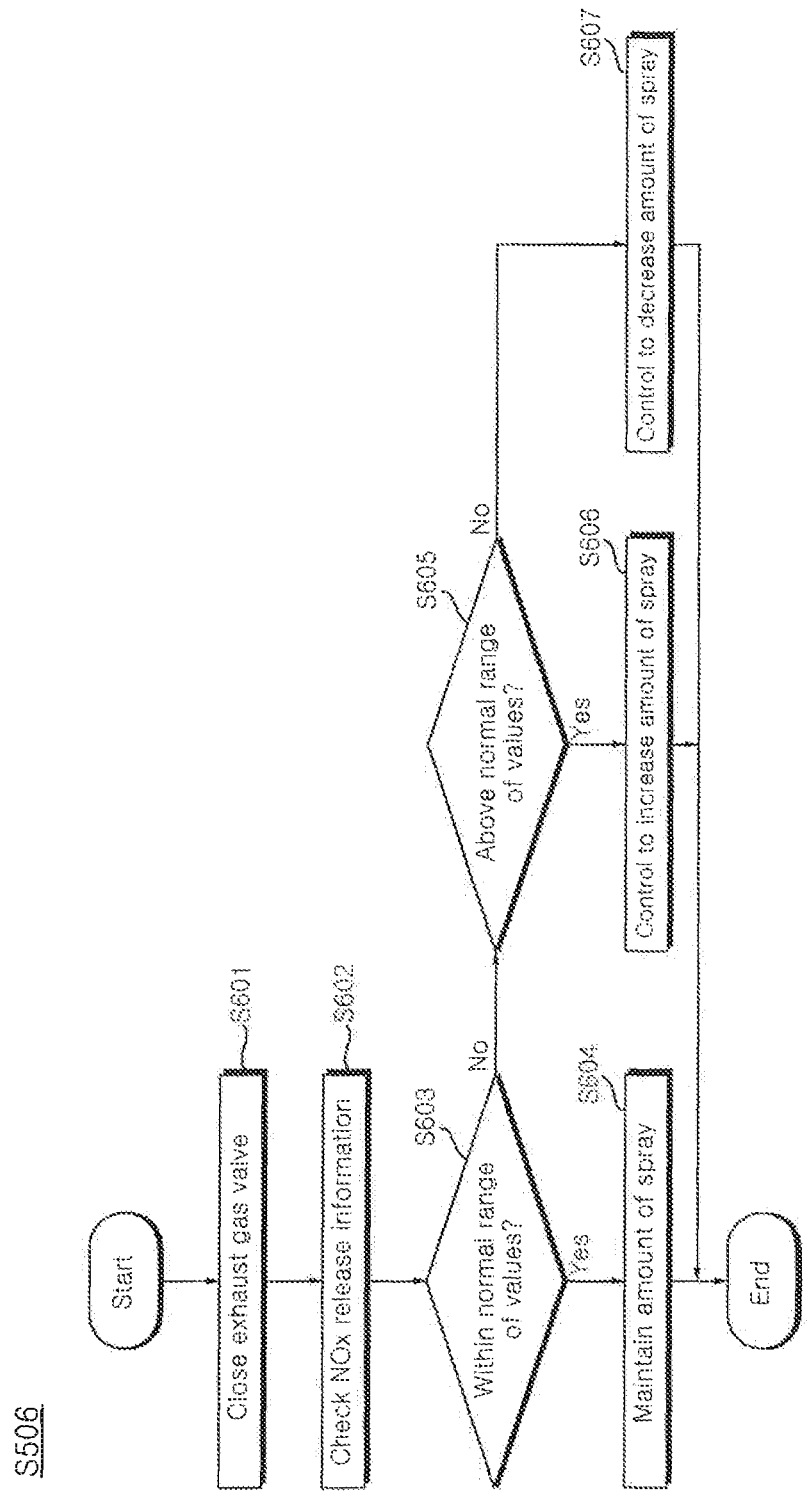

Referring to FIG. 6, in the step S601, the gas engine heat pump 10 may close the exhaust gas valve 85 in order to stop the exhaust gases stored in the buffer tank 84 from flowing to the intake manifold 31.

In the step S602, the gas engine heat pump 10 may check information (hereinafter, NOx release information) on the release of nitrogen oxides such as the concentration, partial pressure, and total content of nitrogen oxides.

In the step S603, the gas engine heat pump 10 may determine whether a value in the NOx release information is within a normal range. For example, the gas engine heat pump 10 may determine whether the concentration of nitrogen oxides is lower than a preset first concentration (e.g., 105 ppm) and higher than or equal to a second concentration (e.g., 95 ppm) which is lower than the first concentration.

In the step S604, if the value in the NOx release information is within the normal range, the gas engine heat pump 10 may maintain the amount of spray from the exhaust gas spray nozzle 87.

Meanwhile, in the step S605, if the value in the NOx release information is not within the normal range, the gas engine heat pump 10 may determine whether the value in the NOx release information is above the normal range or not. For example, the gas engine heat pump 10 may determine whether the concentration of nitrogen oxides exceeds a preset first concentration (e.g., 105 ppm).

In the step S606, if the value in the NOx release information is above the normal range, the gas engine heat pump 10 may control to increase the amount of exhaust gases sprayed from the exhaust gas spray nozzle 87.

Meanwhile, in the step S607, if the value in the NOx release information is not within the normal range and not above the normal range—that is, the value in the NOx release information is below the normal range, the gas engine heat pump 10 may control to decrease the amount of exhaust gases sprayed from the exhaust gas spray nozzle 87.

FIG. 8 is a view to be referenced to explain the exhaust gas spray nozzle 87's operation of spraying exhaust gases into the cylinder 35.

Referring to FIG. 8, the engine 30 may include at least one cylinder 35, an intake valve 828 for regulating the intake of a mixture into the at least one cylinder 35, and an exhaust valve 830 for regulating the release of exhaust gases from the at least one cylinder 35.

A plurality of cylinders 35 may be provided depending on the power required for the engine 30. The engine 30 may generate power by performing four strokes of intake, compression, explosion, and exhaust on a mixture of air and gas fuel entering the cylinders 35. For example, the engine 30 may be a four-cylinder engine with four cylinders.

The intake valve 828 may function to provide a mixed fuel into the cylinder 35. The intake valve 828 may be opened by a cam nose provided on a cylinder head (not shown) that sits above the cylinder 35 and closed by the force of a spring.

The exhaust valve 830 may function to release combustion gases which have passed through the explosion stroke inside the cylinder 35. The exhaust valve 830 and the intake valve 828 may be opened and closed in a likewise manner. When the exhaust valve 830 is opened, the combustion gases may be released from the engine 30.

The engine 30 may include an intake pressure sensor 854 that senses the pressure of the mixture.

The engine 30 may further include a plurality of pistons 814 that perform upward and downward reciprocating motion within each of the cylinders 35, a plurality of connecting rods 816 respectively connected to the pistons 814 to receive force from the pistons 814 and/or a crank shaft 818 connected to the connecting rods 816 to perform reciprocating motion, and a crank wheel 820 connected to the crank shaft 818 to rotate, with a plurality of teeth formed around it.

The piston 814 may function to transfer a large force to the connecting rods 816 by the expansion of combustion gases whose temperature instantly rises to a very high temperature.

The connecting rods 816 may connect the pistons 814 and the crank shaft 818, and may function to convert the reciprocating motion of the pistons 814 to rotational motion of the crank shaft 818.

The crank shaft 818 may perform rotational motion by means of the connecting rods 816. As such, the engine 30 is able to provide power to the compressor 50 of the gas engine heat pump 10 by adjusting the frequency of rotations (RPM).

The engine 30 may further include an ignition plug 826 for burning a mixture in the cylinder 35.

The ignition plug 826 may function to ignite the mixture that has passed through the compression stroke. For example, the ignition plug 826 may ignite the compressed mixture through a spark discharge caused by a high-voltage current produced from a coil.

The engine 30 may include a crank sensor 856 for sensing the number of revolutions of the crank wheel 820 and a cam sensor 858 for detecting the positions of the pistons 814 moving within the cylinder 35.

The engine 30 may further include an exhaust gas spray nozzle 87 for spraying exhaust gases for each cylinder 35. The exhaust gas spray nozzle 87 may spray the exhaust gases stored in the buffer tank 84 into the cylinder 35, at a point in time when the intake valve 828 of the engine 30 is closed after the mixture is drawn into the cylinder 35 by opening the intake valve 828.

Referring back to FIG. 5, in the step S507, if a gas pressure in the buffer tank 84 is lower than a reference pressure or the gas pressure in the buffer tank 84 is higher than or equal to the reference pressure but a target load on the engine 30 is smaller than a reference load, the gas engine heat pump 10 may control the opening degree of the exhaust gas valve 85.

Figure 7:
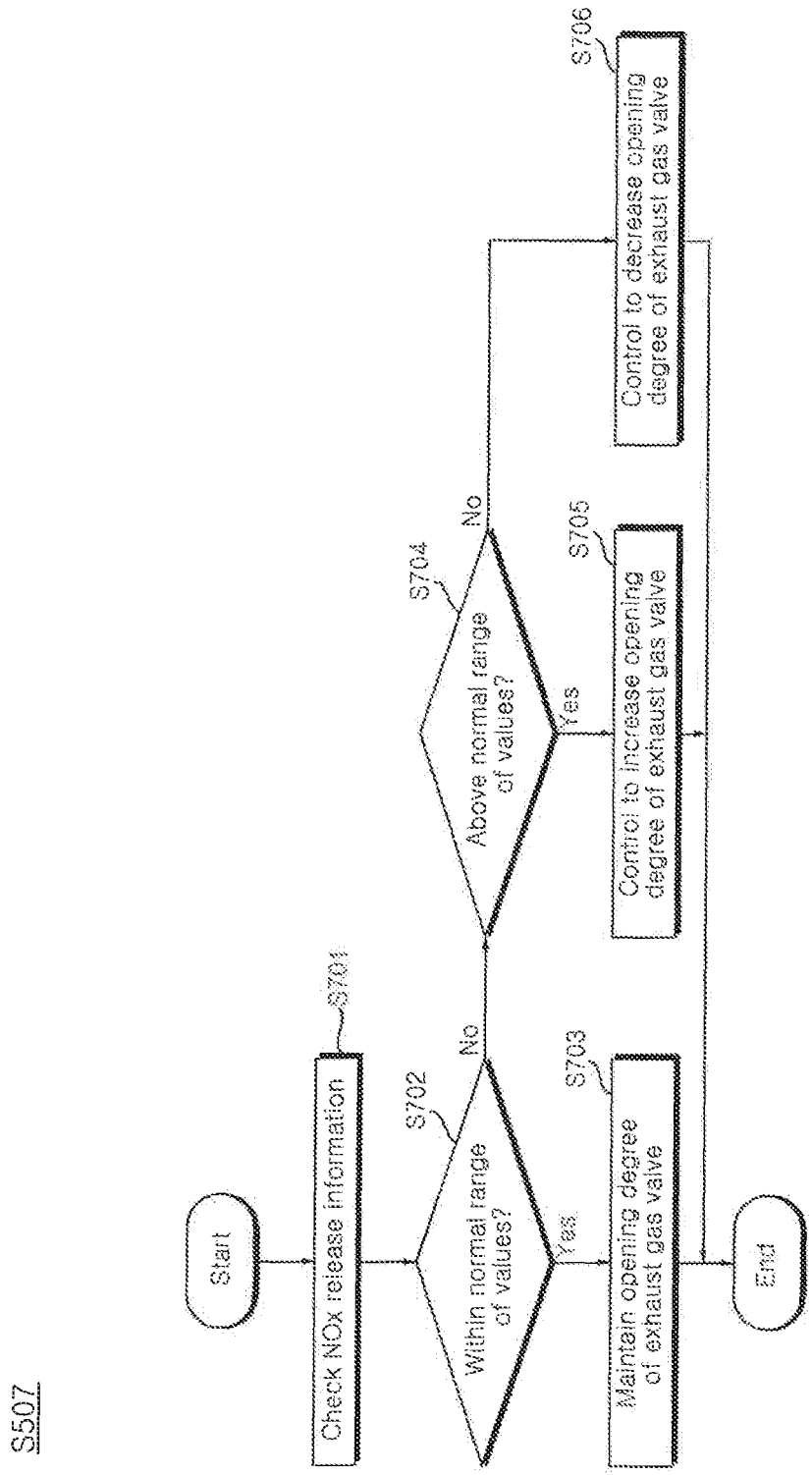

Referring to FIG. 7, in the step S701, the gas engine heat pump 10 may check NOx release information through the exhaust gas sensor 94.

In the step S702, the gas engine heat pump 10 may determine whether a value in the NOx release information is within a normal range.

In the step S703, if the value in the NOx release information is within the normal range, the gas engine heat pump 10 may maintain the opening degree of the exhaust gas valve 85.

Meanwhile, in the step S704, if the value in the NOx release information is not within the normal range, the gas engine heat pump 10 may determine whether the value in the NOx release information is above the normal range. For example, the gas engine heat pump 10 may determine whether the concentration of nitrogen oxides exceeds a preset first concentration (e.g., 105 ppm).

In the step S705, if the value in the NOx release information is above the normal range, the gas engine heat pump 10 may control to increase the opening degree of the exhaust gas valve 85.

Meanwhile, in the step S706, if the value in the NOx release information is not within the normal range and not above the normal range—that is, the value in the NOx release information is below the normal range, the gas engine heat pump 10 may control to decrease the opening degree of the exhaust gas valve 85.

Referring back to FIG. 5, in the step S508, the gas engine heat pump 10 may check whether the operation of the engine 30 is finished or not. For example, once an operation end command is received, or once a user input for stopping the operation of every indoor unit 20, the gas engine heat pump 10 may determine that the operation of the engine 30 is finished.

If the operation of the engine 30 is not finished, the gas engine heat pump 10 may return to the step S504 and control the operation of the exhaust gas valve 85 and/or exhaust gas spray nozzle 87, based on the gas pressure inside the buffer tank 84 and/or the target load on the engine 30.

In the step S509, if the operation of the engine 30 is finished, the gas engine heat pump 10 may stop running the engine 30.

As described above, according to various embodiments of the present disclosure, it is possible to reduce the production of nitrogen oxides, since the combustion temperature in the cylinder 35 may be lowered to various temperatures by compressing at least part of the exhaust gases coming from the engine 30 and storing it in the buffer tank 84 and supplying the exhaust gases stored in the buffer tank 84 to the intake manifold 31 according to a predetermined condition or spraying it directly into the cylinder 35.

Furthermore, according to various embodiments of the present disclosure, it is possible to reduce the production of nitrogen oxides, since the temperature of the mixture and the combustion temperature in the cylinder may be lowered by spraying condensate produced from the exhaust gases to an intake pipe while the engine 30 is running.

The accompanying drawings are only for easily understanding the exemplary embodiment disclosed in the specification and the technical spirit disclosed in the specification is not limited by the accompanying drawings and it should appreciated that the accompanying drawings include all changes, equivalents, or substitutions included in the spirit and the technical scope of the present disclosure.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous.

In addition, although the exemplary embodiments of the present disclosure have been shown and described above, the present disclosure is not limited to the specific embodiments described above, and the technical field to which the present disclosure belongs without departing from the gist of the present disclosure claimed in the claims. In addition, various modifications can be carried out by a person having ordinary knowledge, and these modifications should not be individually understood from the technical idea or prospect of the present disclosure.

What is claimed is:

1. A gas engine heat pump, comprising:
    an engine that burns a mixture of air and fuel;
    an exhaust gas compressor that compresses exhaust gases coming from the engine;
    a buffer tank that stores the exhaust gases compressed by the exhaust gas compressor;
    an exhaust gas valve disposed between the buffer tank and an intake manifold of the engine;
    an exhaust gas spray nozzle that sprays the exhaust gases stored in the buffer tank into a cylinder of the engine;
    an exhaust gas sensor that acquires information on the exhaust gases coming from the engine; and
    a controller configured to control operation of at least one of the exhaust gas valve or the exhaust gas spray nozzle, based on the information on the exhaust gases acquired by the exhaust gas sensor, wherein the controller is configured to:
        when a pressure in the buffer tank is higher than or equal to a reference pressure, control the exhaust gas valve to close and the exhaust gas spray nozzle to regulate an amount of the exhaust gases sprayed into the cylinder; and
        when the pressure in the buffer tank is lower than the reference pressure, control the exhaust gas valve to regulate an amount of the exhaust gases flowing into the intake manifold of the engine.

2. The gas engine heat pump of claim 1, wherein the information on the exhaust gases is a concentration of nitrogen oxides in the exhaust gases.

3. The gas engine heat pump of claim 2, wherein the controller is configured to regulate an opening degree of the exhaust gas valve based on the concentration of nitrogen oxides when the pressure in the buffer tank is lower than the reference pressure.

4. The gas engine heat pump of claim 3, wherein the controller is further configured to:
    determine whether a target load on the engine is larger than or equal to a reference load when the pressure in the buffer tank is higher than or equal to the reference pressure;
    control the exhaust gas valve to open and regulate the opening degree of the exhaust gas valve based on the concentration of nitrogen oxides if the target load on the engine is smaller than the reference load; and
    control the exhaust gas valve to close and control the operation of the exhaust gas spray nozzle to regulate the amount of the exhaust gases sprayed into the cylinder if the target load on the engine is larger than or equal to the reference load.

5. The gas engine heat pump of claim 4, wherein the controller is further configured to:
    increase the opening degree of the exhaust gas valve if the concentration of nitrogen oxides is higher than or equal to a first concentration;
    decrease the opening degree of the exhaust gas valve if the concentration of nitrogen oxides is lower than a second concentration which is lower than the first concentration; and
    maintain the opening degree of the exhaust gas valve if the concentration of nitrogen oxides is lower than the first concentration and higher than or equal to the second concentration.

6. The gas engine heat pump of claim 5, wherein the controller is further configured to:
- close the exhaust gas valve when the pressure in the buffer tank is higher than or equal to the reference pressure and the target load on the engine is larger than or equal to the reference load; and
- regulate the amount of spray from the exhaust gas spray nozzle based on the concentration of nitrogen oxides.

7. The gas engine heat pump of claim 6, wherein the controller is further configured to:
- increase the amount of spray from the exhaust gas spray nozzle if the concentration of nitrogen oxides is higher than or equal to the first concentration;
- decrease the amount of spray from the exhaust gas spray nozzle if the concentration of nitrogen oxides is lower than the second concentration; and
- maintain the amount of spray from the exhaust gas spray nozzle if the concentration of nitrogen oxides is lower than the first concentration and higher than or equal to the second concentration.

8. The gas engine heat pump of claim 7, wherein the exhaust gas spray nozzle is configured to spray the exhaust gases stored in the buffer tank into the cylinder, at a point in time when an intake valve of the engine is closed after being open.

9. The gas engine heat pump of claim 8, further comprising:
- a throttle valve that regulates a flow of the mixture entering the engine;
- a muffler that allows the exhaust gases coming from the engine to flow therethrough;
- a drain filter that neutralizes condensate produced in the muffler;
- a condensate pump that moves the condensate from at least one of the drain filter or the buffer tank; and
- a condensate spray nozzle that sprays the condensate pumped to flow by the condensate pump into a pipe connected to the throttle valve.

10. The gas engine heat pump of claim 9, wherein the controller is further configured to run the condensate pump and control the condensate to be sprayed into the pipe connected to the throttle valve via the condensate spray nozzle, while the engine is running.

11. A method of operating a gas engine heat pump comprising an engine that burns a mixture of air and fuel; an exhaust gas compressor that compresses exhaust gases coming from the engine; and a buffer tank that stores the exhaust gases compressed by the exhaust gas compressor, the method comprising:
- acquiring information on the exhaust gases coming from the engine through an exhaust gas sensor;
- determining a pressure inside of the buffer tank through a pressure sensor;
- when the pressure in the buffer tank is higher than or equal to a reference pressure, controlling an exhaust gas valve to close and an exhaust gas spray nozzle to regulate an amount of the exhaust gases sprayed into a cylinder of the engine;
- when the pressure in the buffer tank is lower than the reference pressure, controlling the exhaust gas valve to regulate an amount of the exhaust gases flowing into an intake manifold of the engine; and
- controlling operation of at least one of the exhaust gas valve or the exhaust gas spray nozzle, based on the information on the exhaust gases acquired by the exhaust gas sensor, wherein the exhaust gas valve is disposed between the buffer tank and the intake manifold of the engine, and wherein the exhaust gas spray nozzle is configured to spray the exhaust gases stored in the buffer tank into the cylinder of the engine.

12. The method of claim 11, wherein the information on the exhaust gases is a concentration of nitrogen oxides in the exhaust gases.

13. The method of claim 12, wherein the controlling comprises regulating an opening degree of the exhaust gas valve based on the concentration of nitrogen oxides when the pressure in the buffer tank is lower than the reference pressure.

14. The method of claim 13, wherein the controlling comprises:
- determining whether a target load on the engine is larger than or equal to a reference load if the pressure in the buffer tank is higher than or equal to the reference pressure;
- controlling the exhaust gas valve to open and regulating the opening degree of the exhaust gas valve based on the concentration of nitrogen oxides if the target load on the engine is smaller than the reference load; and
- controlling the exhaust gas valve to close and controlling the operation of the exhaust gas spray nozzle to regulate the amount of the exhaust gases sprayed into the cylinder if the target load on the engine is larger than or equal to the reference load.

15. The method of claim 14, wherein the regulating of the opening degree of the exhaust gas valve comprises:
- increasing the opening degree of the exhaust gas valve if the concentration of nitrogen oxides is higher than or equal to a first concentration;
- decreasing the opening degree of the exhaust gas valve if the concentration of nitrogen oxides is lower than a second concentration which is lower than the first concentration; and
- maintaining the opening degree of the exhaust gas valve if the concentration of nitrogen oxides is lower than the first concentration and higher than or equal to the second concentration.

16. The method of claim 15, wherein the controlling of the exhaust gas spray nozzle comprises:
- closing the exhaust gas valve when the pressure in the buffer tank is higher than or equal to the reference pressure and the target load on the engine is larger than or equal to the reference load; and
- regulating the amount of spray from the exhaust gas spray nozzle based on the concentration of nitrogen oxides.

17. The method of claim 16, wherein the regulating of the amount of spray from the exhaust gas spray nozzle comprises:
- increasing the amount of spray from the exhaust gas spray nozzle if the concentration of nitrogen oxides is higher than or equal to the first concentration;
- decreasing the amount of spray from the exhaust gas spray nozzle if the concentration of nitrogen oxides is lower than the second concentration; and
- maintaining the amount of spray from the exhaust gas spray nozzle if the concentration of nitrogen oxides is lower than the first concentration and higher than or equal to the second concentration.

18. The method of claim 17, wherein the exhaust gas spray nozzle sprays the exhaust gases stored in the buffer tank into the cylinder, at a point in time when an intake valve of the engine is closed after being open.

19. The method of claim 18, wherein the gas engine heat pump further comprises:

a throttle valve that regulates a flow of the mixture entering the engine;

a muffler that allows the exhaust gases coming from the engine to flow therethrough;

a drain filter that neutralizes condensate produced in the muffler;

a condensate pump that moves the condensate from at least one of the drain filter or the buffer tank; and a condensate spray nozzle that sprays the condensate pumped to flow by the condensate pump into a pipe connected to the throttle valve.

20. The method of claim 19, further comprising running the condensate pump and spraying the condensate into the pipe connected to the throttle valve via the condensate spray nozzle, while the engine is running.

* * * * *